Figure 1A:
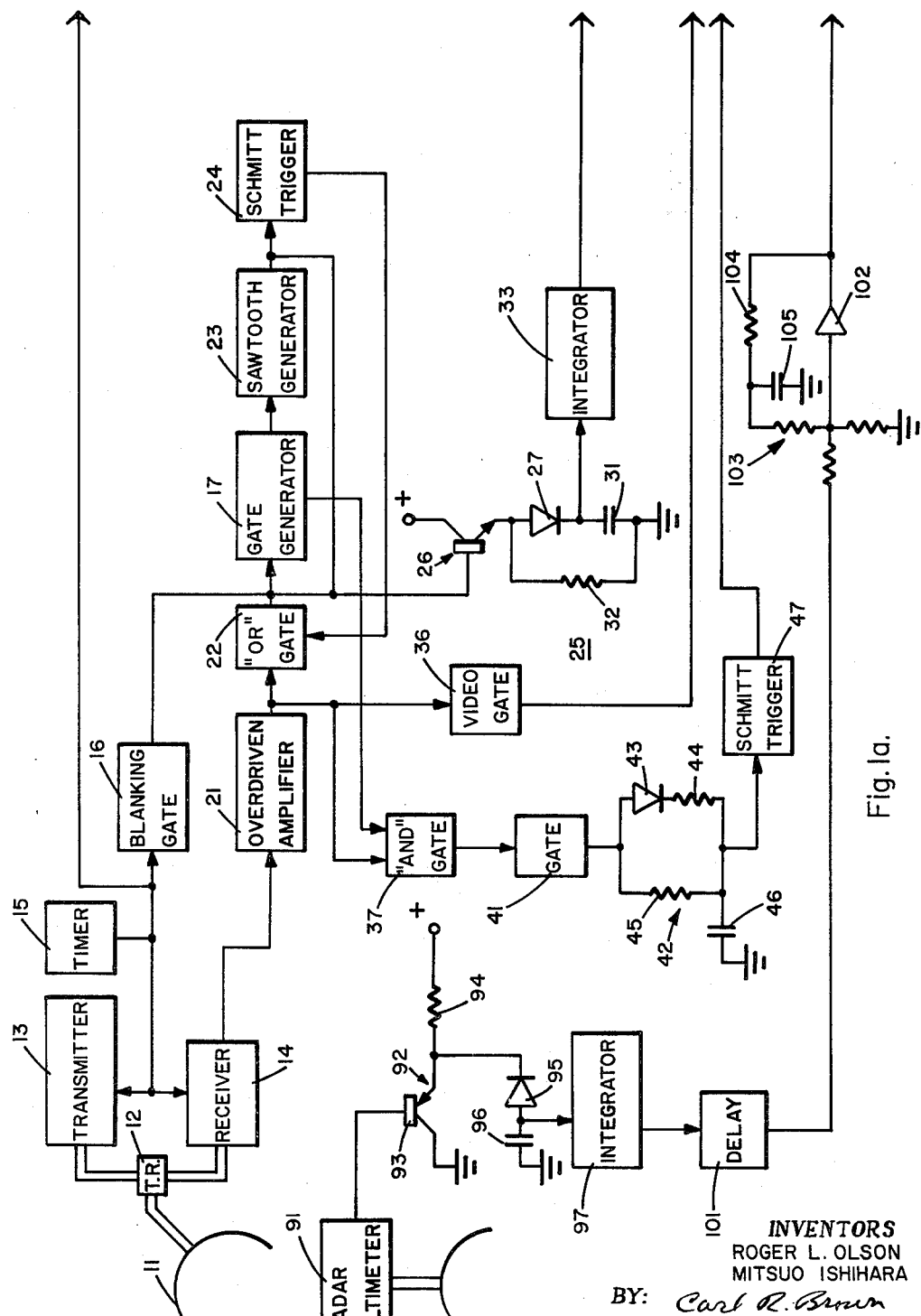

United States Patent Office 3,210,760
Patented Oct. 5, 1965

3,210,760
TERRAIN AVOIDANCE RADAR
Roger L. Olson and Mitsuo Ishihara, San Diego, Calif., assignors to General Dynamics Corporation, San Diego, Calif., a corporation of Delaware
Filed Aug. 13, 1962, Ser. No. 216,533
10 Claims. (Cl. 343—7)

This invention relates to radar devices, and more particularly, to a radar device providing a control signal enabling an aircraft to be flown at a selected low altitude over rough terrain.

Two radar sources provide the necessary information to a computer, which, in turn, processes a control signal to a pilot's indicator or to an automatic pilot, flying the craft directly. A radar altimeter having a beam directed downward provides a signal representing the actual height of the aircraft over the terrain. A radar set having an antenna fixed to the aircraft at a known angle to look forward and downward provides a signal representing obstacles in the path of the aircraft. Both signals are applied to data processing circuits which produce an output voltage command signal. The command signal is applied to an indicator on the pilot's instrument panel. Alternatively, or in addition, the command signal may be applied directly to the automatic pilot.

Flying over flat, or gradually rising or falling terrain, the command signal is dependent upon the radar altimeter signal, enabling the aircraft to maintain a constant altitude above the ground. Rough terrain requires the forward-and-downward looking radar in addition, providing the ability to detect and respond to individual objects within a field moving with the aircraft located at a preselected distance ahead in the flight path. The angle at which the antenna is mounted is determined by the flight characteristics of the aircraft, and by the worst types of terrain conditions to be encountered.

The forward-looking radar measures slant range to the first signal returning object ahead of the aircraft, while the altimeter measures height above terrain. A reference altitude and range over level terrain are set into the computer. The two radar devices continually measure present values of range and height. These signals are applied to the computer, where they are compared with the preset reference values. When either becomes less than the reference values, a pitch-up command signal is generated. When the forward radar beam "looks" over the crest of a hill, the height input from the radar altimeter is utilized to maintain clearance. If both input signals simultaneously indicate clearance greater than the reference, the computer generates a pitch-down command signal.

The maximum magnitude of the command signals is limited to avoid overstressing the aircraft structure and fatiguing the crew. Rate of change of height and range are also determined and employed as damping factors.

It is, therefore, an object of this invention to provide a device enabling safe flight at a low altitude.

Another object of this invention is to provide an aircraft terrain avoidance device.

Another object of this invention is to provide an aircraft terrain avoidance device having a radar altimeter and a forward looking radar having a fixed antenna.

Another object of this invention is to provide a terrain avoidance device including a computer responsive to an altitude signal and a range signal.

Another object of this invention is to provide a terrain avoidance device providing an aircraft command signal in response to height above the terrain and distance to an obstacle.

Another object of this invention is to provide an aircraft terrain avoidance device which is simple, safe and reliable in operation, and is simple and inexpensive to build.

Figure 1B:
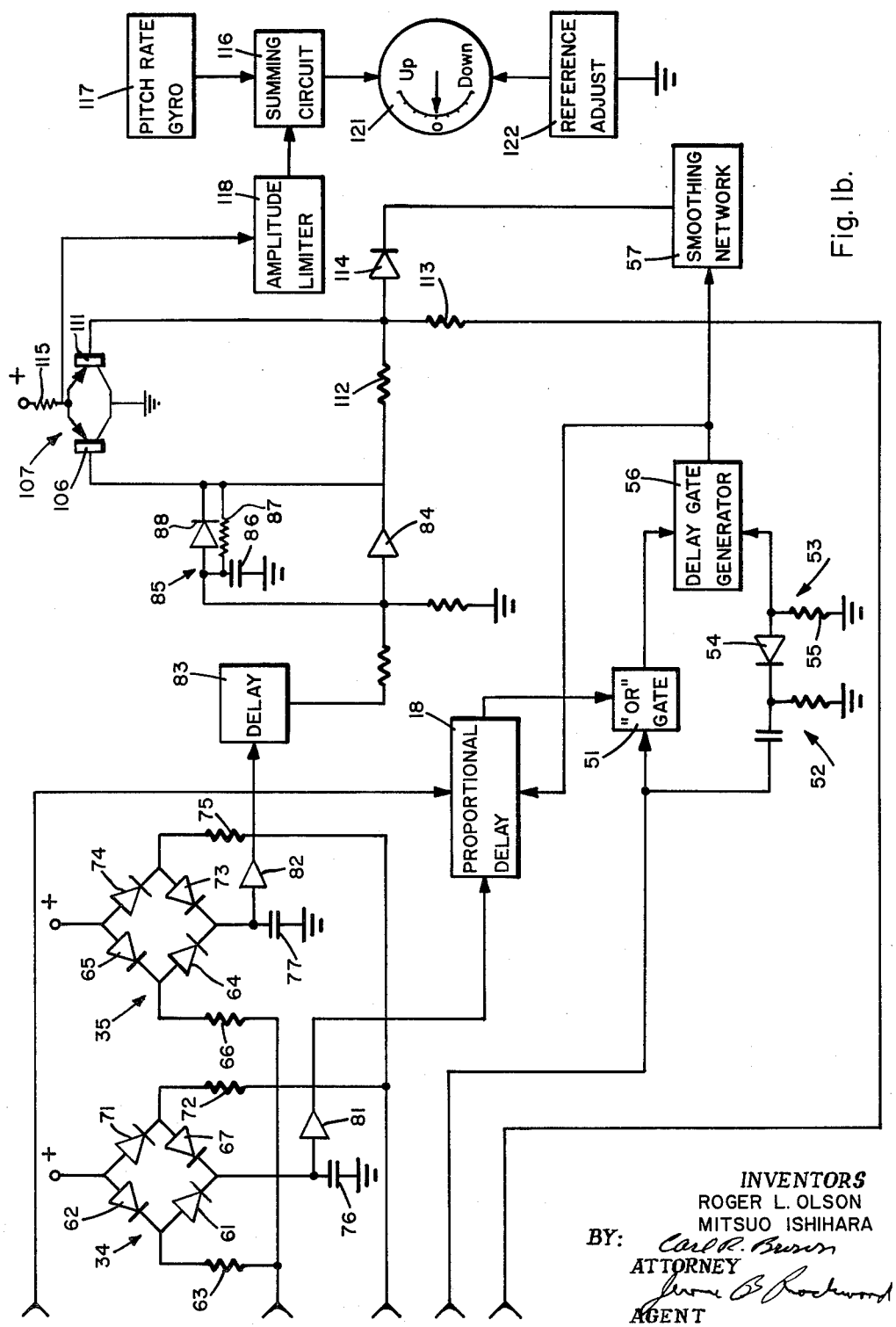

Other objects and advantages will be apparent from the following description taken in connection with the accompanying drawing, wherein:

FIGURES 1a and 1b schematically illustrate the terrain avoidance device of the present invention.

Referring now to the drawing, a forward looking radar antenna 11 is mounted on an aircraft (not shown) at a known acute angle with the normal line of flight. Antenna 11 is connected through a suitable isolating device such as T.R. box 12 to a radar pulse transmitter 13 and receiver 14. A synchronizing pulse timer 15 provides constant repetition rate synchronizing pulses to transmitter 13, receiver 14, blanking gate 16, and a proportional pulse delay circuit 18. Blanking gate 16 is a monostable multivibrator, and serves to blank out any range pulse from the forward looking radar representing less than a predetermined minimum range by providing the starting trigger for gate generator 17.

Receiver 14 receives the R.F. pulse reflected from an obstacle, and converts the received pulse to video form. The video pulse is amplified and sharpened in an overdriven amplifier 21. The received video pulse, after shaping in overdriven amplifier 21, is applied to "or" gate 22, along with an output pulse from Schmitt trigger 24. The blanking gate signal is employed to blank out any range signal indicating less than a predetermined minimum range, as disclosed hereinabove. The time constant of the monostable multivibrator comprising blanking gate 16 is such that gate generator 17 cannot provide an output signal, even if energized by a signal from "or" gate 22, during the time period representing the predetermined minimum range. An output pulse is produced by gate generator 17 in response to a received pulse at a time after the minimum range period set by blanking gate 16. An output pulse from gate generator 17 is applied to a sawtooth generator 23. The output of sawtooth generator 23 is fed to Schmitt trigger circuit 24. As is well-known to those skilled in the art, a Schmitt trigger circuit provides an output pulse when the input voltage exceeds a predetermined level. Thus, the sawtooth waveform from sawtooth generator 23 causes Schmitt trigger 24 to generate an output pulse at a time representing a predetermined maximum range if no signal is returned to receiver 14. Blanking gate 16 starts sawtooth generator 23 through gate generator 17, and the received pulse sets the amplitude of the sawtooth voltage.

The voltage reached by the output signal from sawtooth generator 23, proportional to the range of the detected obstacle, is applied to a peak detector 25. Peak detector 25 includes an npn transistor 26, a diode 27 and a capacitor 31 between the emitter of transistor 26 and ground, and resistor 32, connected in parallel with diode 27 and capacitor 31. Transistor 26 and diode 27 conduct, allowing capacitor 31 to be charged to the peak voltage of the sawtooth once each radar system timing cycle. Blanking gate 16 provides a reset signal for peak detector 25, causing diode 27 to conduct and allowing capacitor 31 to discharge. The peak voltage pulses from peak detector 25 is applied to integrator 33. Here, the peak voltage pulses each having an amplitude proportional to instantaneous range, are smoothed to provide a varying direct voltage level proportional to range. The output voltage from integrator 33 is applied to hold circuits 34 and 35.

The range pulse from overdriven amplifier 21 is also applied to video gate 36 and to "and" gate 37. Video gate 36 is a monostable multivibrator, and is connected to hold circuits 34 and 35. A conventional "and" gate 37 provides an output pulse only when a range pulse coincides with a signal from gate generator 17. The output from "and" gate 37 is applied to a monostable multivibrator coincidence gate 41. The output pulse is applied to an unbalanced integrator 42.

Unbalanced integrator 42 includes a diode 43, a resistor 44 in series with diode 43, a resistor 45 in parallel with diode 43 and resistor 44, and capacitor 46 connected between the junction of resistors 44 and 45, and ground. Due to the diode 43 circuit, unbalanced integrator 42 has two time constants. Capacitor 45 charges quickly, but discharges slowly. Thus, when a signal is present, it is integrated quickly, but when the signal disappears, as from vibration, or when the forward-looking radar faces over a ridge, or the aircraft is pointed upward, the previous signal is held in the integrator.

The D.C. output voltage from unbalanced integrator 42 is applied to a Schmitt trigger circuit 47. The integrator voltage is used to normally bias off Schmitt trigger 47. When Schmitt trigger 47 "fires," the output is applied to "or" gate 51 and to a differentiator 52 and negative pulse selector 53. The output signal from proportional delay 18 is also applied to "or" gate 51. As is well known to the art, an R–C differentiator such as 52, provides a positive pulse and a negative pulse when excited by a gate pulse, or square wave. Negative pulse selector 53 comprises a diode 54 and a load resistor 55, poled to that positive pulses are blocked, and negative pulses are passed.

Negative output pulses and the output from "or" gate 51 are applied to delay gate generator 56. Delay gate generator 56, which may conveniently be a conventional bistable multivibrator, provides an output gate pulse to smoothing network 57 and to proportional delay network 18. The negative output pulse provides a delay start trigger when the Schmitt trigger output goes negative in the absence of a range signal. The negative pulse starts the delay gate generator. This gate starts the proportional delay 18, which delays the output pulse therefrom by an amount proportional to the range reference voltage from hold circuit 34.

Hold circuits 34 and 35 have one input terminal connected to integrator 33, providing a D.C. voltage proportional to range, and a second input terminal connected to video gate 36, providing a gate pulse started by a received range signal. The first signal, from integrator 33, is applied to the junction of diodes 61 and 62 through resistor 63, and to the junction of diodes 64 and 65 through resistor 66. The gate pulse from video gate 36 is applied to the junction of diodes 67 and 71 through resistor 72, and to the junction of diodes 73 and 74 through resistor 75. Capacitor 76 is connected between the junction of diodes 61 and 67, and ground, and capacitor 77 is connected between the junction of diodes 64 and 73, and ground. An isolator 81 is serially connected between the high side of capacitor 76 and proportional delay 18. Similarly, an isolator 82 is serially connected between the high side of capacitor 77 and fixed delay line 83.

The range signal from delay line 83 is applied to operational amplifier 84 and associated feedback network 85. A shunt capacitor 86, series resistor 87 and diode 88 in feedback network 85 insert a negative range rate signal, or speed of closure toward an obstacle, and adds it to the range signal.

Altitude is determined by a radar altimeter 91, of a type well known to the art. The output signal from the radar altimeter is a direct voltage level proportional to altitude above the terrain. A minimum detector circuit 92 receives the height-representing D.C. level from radar altimeter 91. Minimum detector circuit 92 includes a pnp transistor 93 having the emitter connected to a positive voltage source through a load resistor 94, a grounded collector, and the base connected to the signal source, radar altimeter 91. A diode 95 and a capacitor 96 are serially connected between the emitter and resistor 94. An output voltage is taken across capacitor 96. Minimum detector 92 normally provides an output voltage directly proportional to the input voltage. However, as the input signal fluctuates over rough terrain, diode 95 allows capacitor 96 to charge to a voltage representing only the minimum detected altitude. As the altimeter signal fluctuates above the minimum, diode 95 cuts off, preventing additional charging of capacitor 96.

An integrator 97 receives the altitude-representing signal voltage from minimum detector 92. Integrator 97 smooths the minimum detected signal. The smoothed minimum altitude signal is applied through a delay line 101 to an operational amplifier 102 and associated feedback network 103. Feedback network 103 includes series resistor 104 and shunt capacitor 105. The D.C. altitude signal is converted to altitude and altitude rate signals.

Three types of information are present on three channels. A voltage level representing range and range rate is present at the output of operational amplifier 84. An altitude and altitude rate signal is present at the output of operational amplifier 102. The third signal, present at the output of smoothing network 57, is the delay-dive-command signal. This signal inhibits the dive command for a period of time proportional to the range of the last received return before the forward-looking radar signal is lost as the radar looks over the top of a ridge line, etc.

The range and range rate signal is applied directly to the base of transistor 106 in majority circuit 107. Range and range rate is also applied to the base of transistor 111 through summing resistor 112. The height and height rate signal from operational amplifier 102 is also applied to the base of transistor 111 through summing resistor 113. The delay-dive-command signal from smoothing network 57 is applied to the base of transistor 111 through diode 114. The collectors of transistors 106 and 111 are connected to ground, and the emitters are connected to a suitable positive voltage source through load resistor 115.

As will be apparent, the voltage across resistor 115 varies directly with range and range rate, and with the sum of range and range rate and height and height rate. Thus, with a close obstacle, or a low altitude signal, a climb signal output level will be produced, or, conversely, a dive signal output level will be produced by a high altitude signal and a distant obstacle range signal. The delay-dive-command signal is normally blocked by diode 114, the output of smoothing network 57 being highly positive. When the radar signal is lost, and the channel becomes operative, the output voltage drops. Diode 114 conducts if the sum signal at the junction of resistors 112 and 113 is more positive, or is giving a dive command. The voltage from the delay channel counteracts the dive command for a period of time enabling the aircraft to clear the last obstacle received on the forward-looking radar before the signal was lost due to looking over the ridge line.

The command signal from majority circuit 107 is applied through an amplitude limiter 118 to a summing circuit 116. Also applied to summing circuit 116 is a D.C. output voltage from a pitch rate gyro 117. The polarity of the signal from pitch rate gyro 117 opposes the command signal, thus assisting in limiting the forces applied to the aircraft, as does the amplitude limiter. The output of summing circuit 116 is applied to a pilot's indicator 121, which may be a simple d'Arsonval meter. Alternatively, or in addition to meter 121, the command signal may be applied to an automatic pilot to control the aircraft directly. A "reference adjust" variable voltage source 122 is provided to adjust the meter to zero to indicate level flight at the desired altitude over flat level terrain. The pilot flies the aircraft to keep the needle on indicator 121 at zero, the autopilot, if employed, also flying the aircraft in such a manner as to null the command signal.

While a presently preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. An aircraft terrain avoidance device comprising an obstacle-detecting radar having a forward-facing antenna, a radar altimeter, a first computer circuit connected to said obstacle-detecting radar for providing a voltage level proportional to range and range rate, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to rate of pitch, voltage combining means connected to said first, second and third computer circuits and to said pitch rate measuring means for providing pitch command signals.

2. An aircraft terrain avoidance device comprising an obstacle-detecting radar having a forward-facing antenna, a radar altimeter, a first computer circuit connected to said obstacle-detecting radar for providing a voltage level proportional to range and range rate, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to pitch rate, and voltage combining means connected to said first, second and third computer circuits and to said pitch rate measuring means for providing a pitch command signal proportional to the outputs of said first and third computer circuits, inversely proportional to the output of said pitch rate measuring means, and inhibited by the signal from said second computer circuit.

3. An aircraft terrain avoidance device comprising an obstacle-detecting radar device having a forward-facing antenna, a radar altimeter, a first computer circuit connected to said obstacle-detecting radar for providing a voltage level proportional to range and range rate including means for generating a voltage level proportional to time period between a timing pulse and an echo pulse, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to pitch rate, and voltage combining means connected to said first, second and third computer circuits and to said pitch rate measuring means for providing pitch command signals.

4. An aircraft terrain avoidance device comprising an obstacle-detecting radar device having a forward-facing antenna, a radar altimeter, a first computer circuit connected to said obstacle-detecting radar for providing a voltage level proportional to range and range rate including a sawtooth generator, means for starting said sawtooth generator in response to a timing pulse, means for stopping said sawtooth generator in response to a range pulse, a peak detector connected to said sawtooth generator, an integrator connected to said peak detector, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to pitch rate, voltage combining means connected to said first, second and third computer circuits and to said pitch rate measuring means for providing pitch command signals.

5. An aircraft terrain avoidance device comprising an obstacle-detecting radar device having a forward-facing antenna, a radar altimeter, a first computer circuit connected to said obstacle-detecting radar for providing a voltage level proportional to range and range rate, a second computer circuit connected to said obstacle-detecting radar for providing a voltage level in the absence of a range signal having a level proportional to a last detected obstacle, a third computer circuit connected to said radar altimeter including a minimum detector, and an integrator, and an operational amplifier connected to a negative feedback network for providing a voltage level proportional to altitude and altitude rate of change, pitch rate measuring means providing a voltage level proportional to pitch rate, voltage combining means connected to said first, second and third computer circuits and to said pitch rate measuring means for providing pitch command signals.

6. An aircraft terrain avoidance device comprising an obstacle-detecting radar device having a forward-facing antenna, a radar altimeter, a first computer circuit connected to said obstacle-detecting radar for providing a voltage level proportional to range and range rate including a sawtooth generator, means for starting said sawtooth generator in response to a timing pulse, means for stopping said sawtooth generator in response to a range pulse, a peak detector connected to said sawtooth generator, an integrator connected to said peak detector, a second computer circuit connected to said obstacle-detecting radar for providing a voltage level in the absence of a range signal having a level proportional to a last detected obstacle, a third computer circuit connected to said radar altimeter including a minimum detector, an integrator and an operational amplifier connected to a negative feedback network for providing a voltage level proportional to altitude and altitude rate of change, pitch rate measuring means providing a voltage level proportional to pitch rate, voltage combining means connected to said first, second and third computer circuits and to said pitch rate measuring means for providing pitch command signals.

7. An aircraft terrain avoidance device comprising an obstacle-detecting radar device having a forward-facing antenna, a radar altimeter, a first computer circuit connected to said obstacle-detecting radar for providing a voltage level proportional to range and range rate including a sawtooth generator, means for starting said sawtooth generator in response to a timing pulse, means for stopping said sawtooth generator in response to a range pulse, a peak detector connected to said sawtooth generator, an integrator connected to said peak detector, a second computer circuit connected to said obstacle-detecting radar including a hold circuit, a proportional delay circuit connected to said hold circuit and responsive to a timing pulse, an "or" gate connected to said proportional delay circuit and responsive to a range signal, and a delay gate generator connected to said "or" gate for providing a voltage level in the absence of a range signal having a level proportional to a last detected obstacle, a third computer circuit connected to said radar altimeter including a minimum detector, an integrator and an operational amplifier connected to a negative feedback network for providing a voltage level proportional to altitude and altitude rate of change, pitch rate measuring means providing a voltage level of proportional to pitch rate, voltage combining means connected to said first, second and third computer circuits and to said pitch rate measuring means for providing pitch command signals.

8. An aircraft terrain avoidance device comprising an obstacle-detecting radar device having a forward-facing antenna, a radar altimeter, a first computer circuit connected to said obstacle-detecting radar for providing a voltage level proportional to range and range rate, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to pitch rate, voltage combining means connected to said first, second and third computer circuits, said combining means including first and second transistors having emitters and collectors connected in parallel, means for connecting said first computer circuit to the base of said first transistor, first and second summing resistors and a diode, means for connecting said first computer circuit to said first summing resistor, means for connecting said third computer circuit to said second summing resistor, and means for connecting said second computer circuit to said diode, means for connecting the junction of said first and second summing resistors and said diode to the base of said second transistor, a summing circuit connected in circuit with the parallel emitters of said first and second transistors and to said vertical pitch rate measuring means for providing a pitch command signal output.

9. An aircraft terrain avoidance device comprising an obstacle-detecting radar device having a forward-facing antenna, a radar altimeter, a first computer circuit connected to said obstacle-detecting radar for providing a voltage level proportional to range and range rate including a sawtooth generator, means for starting said sawtooth generator in response to a timing pulse, means for stopping said sawtooth generator in response to a range pulse, a peak detector connected to said sawtooth generator, an integrator connected to said peak detector, a second computer circuit connected to said obstacle-detecting radar for providing a voltage level in the absence of a range signal having a level proportional to a last detected obstacle, a third computer circuit connected to said radar altimeter for providing a voltage level proportional to altitude and altitude rate of change, pitch rate measuring means providing a voltage level proportional to pitch rate, voltage combining means connected to said first, second and third computer circuits, said combining means including first and second transistors having emitters and collectors connected in parallel, means for connecting said first computer circuit to the base of said first transistor, first and second summing resistors and a diode, means for connecting said first computer circuit to said first summing resistor, means for connecting said third computer circuit to said second summing resistor, and means for connecting said second computer circuit to said diode, means for connecting the junction of said first and second summing resistors and said diode to the base of said second transistor, a summing circuit connected in circuit with the parallel emitters of said first and second transistors and to said pitch rate measuring means for providing a pitch command signal output.

10. An aircraft terrain avoidance device comprising an obstacle-detecting radar device having a forward-facing antenna, a radar altimeter, a first computer circuit connected to said obstacle-detecting radar for providing a voltage level proportional to range and range rate including a sawtooth generator, means for starting said sawtooth generator in response to a timing pulse, means for stopping said sawtooth generator in response to a range pulse, a peak detector connected to said sawtooth generator, an integrator connected to said peak detector, a second computer circuit connected to said obstacle-detecting radar including a hold circuit, a proportional delay circuit connected to said hold circuit and responsive to a timing pulse, an "or" gate connected to said proportional delay circuit and responsive to a range signal, and a delay gate generator connected to said "or" gate for providing a voltage level in the absence of a range signal having a level proportional to a last detected obstacle, a third computer circuit connected to said radar altimeter including a minimum detector, an integrator and an operational amplifier connected to a negative feedback network for providing a voltage level proportional to altitude and altitude rate of change, pitch rate measuring means providing a voltage level proportional to pitch rate, voltage combining means connected to said first, second and third computer circuits, said combining means including first and second transistors having emitters and collectors connected in parallel, means for connecting said first computer circuit to the base of said first transistor, first and second summing resistors and a diode, means for connecting said first computer circuit to said first summing resistor, means for connecting said third computer circuit to said second summing resistor, and means for connecting said second computer circuit to said diode, means for connecting the junction of said first and second summing resistors and said diode to the base of said second transistor, a summing circuit connected in circuit with the parallel emitters of said first and second transistors and to said vertical pitch rate measuring means for providing a pitch command signal output.

References Cited by the Examiner
UNITED STATES PATENTS

| | | | |
|---|---|---|---|
| 2,809,340 | 10/57 | Bernhart | 343—7 |
| 2,965,894 | 12/60 | Sweeney | 343—7 |
| 3,052,122 | 9/62 | Westerback | 244—77 |
| 3,070,333 | 12/62 | Hecht et al. | 244—77 |

CHESTER L. JUSTUS, *Primary Examiner.*